United States Patent

Ackley

[11] 3,883,333
[45] May 13, 1975

[54] METHOD AND APPARATUS FOR FORMING A UNIFORM GLASS FIBER CONTINUOUS MAT

[75] Inventor: Richard H. Ackley, Oakmont, Pa.

[73] Assignee: PPG Industries, Inc., Pittsburgh, Pa.

[22] Filed: Oct. 25, 1973

[21] Appl. No.: 410,007

[52] U.S. Cl............. 65/2; 65/11 R; 65/163; 156/62.2
[51] Int. Cl............................................ C03b 37/00
[58] Field of Search............ 65/2, 4, 9, 11 R, 11 W, 65/163; 156/62.2

[56] References Cited
UNITED STATES PATENTS

| | | | |
|---|---|---|---|
| 3,293,013 | 12/1966 | Drummond | 65/11 W |
| 3,516,809 | 6/1970 | Underwood et al. | 65/9 |

*Primary Examiner*—Robert L. Lindsay, Jr.
*Attorney, Agent, or Firm*—Robert DeMajistre

[57] ABSTRACT

A method and apparatus for forming a uniform continuous glass fiber mat is described employing a plurality of glass fiber bushings with attenuators pulling the fibers and depositing them onto a first conveyor. When one of the bushings ceases operation due to a breakout for example, a switch activates a timer activating a relay which causes a second conveyor receiving the mat from a first conveyor to reduce speed to compensate for the diminished amount of glass fibers being conveyed by the first conveyor. After the bushing that is down becomes operational, a switch activates a timer and a relay to effect an increase in the speed of the second conveyor to compensate for the increased amount of glass fibers being delivered by the first conveyor. Hence a uniform density glass fiber mat is produced.

14 Claims, 5 Drawing Figures

METHOD AND APPARATUS FOR FORMING A UNIFORM GLASS FIBER CONTINUOUS MAT

BACKGROUND OF THE INVENTION

1. Field of the Invention

This invention relates to a method and apparatus for forming a continuous uniform density glass fiber mat.

2. Description of the Prior Art

Glass fibers are formed by being drawn at a high rate of speed from molten cones of glass located at the tips of small orifices in a bushing such as shown in U.S. Pat. No. 2,133,238. The drawing force is supplied by either a rotating drum or a belt attenuator which has two flexible rotating opposing surfaces which grips the glass and pulls it through the belt and projects the glass onto a desired surface.

Glass fiber mat can be formed by attenuating glass fibers on o a continuously moving conveyor, the continuousing moving conveyor having an adjustable speed in order to provide the desired density glass fiber mat. The attenuator feeds strand perpendicularly to the surface of the conveyor and is associated with an assembly that provides movement to the attenuator across the width of the conveyor, this movement being adjusted to the width of the glass fiber mat desired on the conveyor surface.

After this mat is formed on the conveyor, it is sometimes needled in order to provide mechanical strength to the continuous mat for ease in handling.

During the formation of glass fibers, small amounts of fuzz and fly accumulate on the fiber forming equipment and the fine filaments break and tangle necessitating a shutdown at the glass fiber bushing. When a plurality of these bushings are used in the formation of glass fiber mat, breakout in one of the bushings causes the mat produced during the shutdown period to be of lower density than the mat produced when all of the bushings are in operation. Thus, a nonuniform mat is often produced in the conventional mat forming process.

Glass fiber mat is useful for a plurality of purposes. Of particular utility has been the use of glass fiber mat as reinforcement for resinous materials. These resinous materials are usually impregnated into the glass fiber mat and form a matrix, the glass fiber mat providing increased strength over that of the normal plastic material. If a non-uniform mat is used for such reinforcement purposes, the products produced therefrom will have substantial variation in strength, some being weaker due to a lack of glass fiber reinforcement and others being stronger due to an increased amount of glass fiber in the matrix.

Thus, it has been desired that a glass fiber mat having uniform density be produced. The instant invention provides a method and apparatus for forming a uniform glass fiber mat having a constant bulk density and uniform physical characteristics.

BRIEF DESCRIPTION OF THE INVENTION

In accordance with this invention a method of forming a continuous uniform glass fiber mat by attenuating glass fibers from molten cones of glass at orifices in a plurality of bushings is provided. The glass fibers after attenuation are gathered into strands and deposited on a first-continuous conveyor by an attenuator system that traverses the width of the conveyor and delivers the glass perpendicularly onto the surface of the conveyor to form a mat. The mat is subsequently conveyed to a second-continuous conveyor and collected. When a breakout in an attenuator occurs, strands from that attenuator are not delivered to the first conveyor. The attenuator out of service is brought to the home position activating an automatic compensator which slows the speed of the second conveyor at a time when the strand deficient portion of the mat is being transferred from the first conveyor to the second conveyor, thus causing the strands to accumulate on the second conveyor and form the same density mat as was formed when all the attenuators were operational. When the attenuator out of service is rethreaded and activated, the automatic compensator increases the speed of the second conveyor at a time when the glass deficient portion of the mat is no longer between the first and second conveyor, thus producing a constant density mat. Additionally, the means for collection of the continuous mat is also adjusted in accordance with the speed of the second conveyor. An apparatus for producing the continuous constant density mat is also within the scope of the instant invention.

DESCRIPTION OF THE PREFERRED EMBODIMENT

Figure 1:
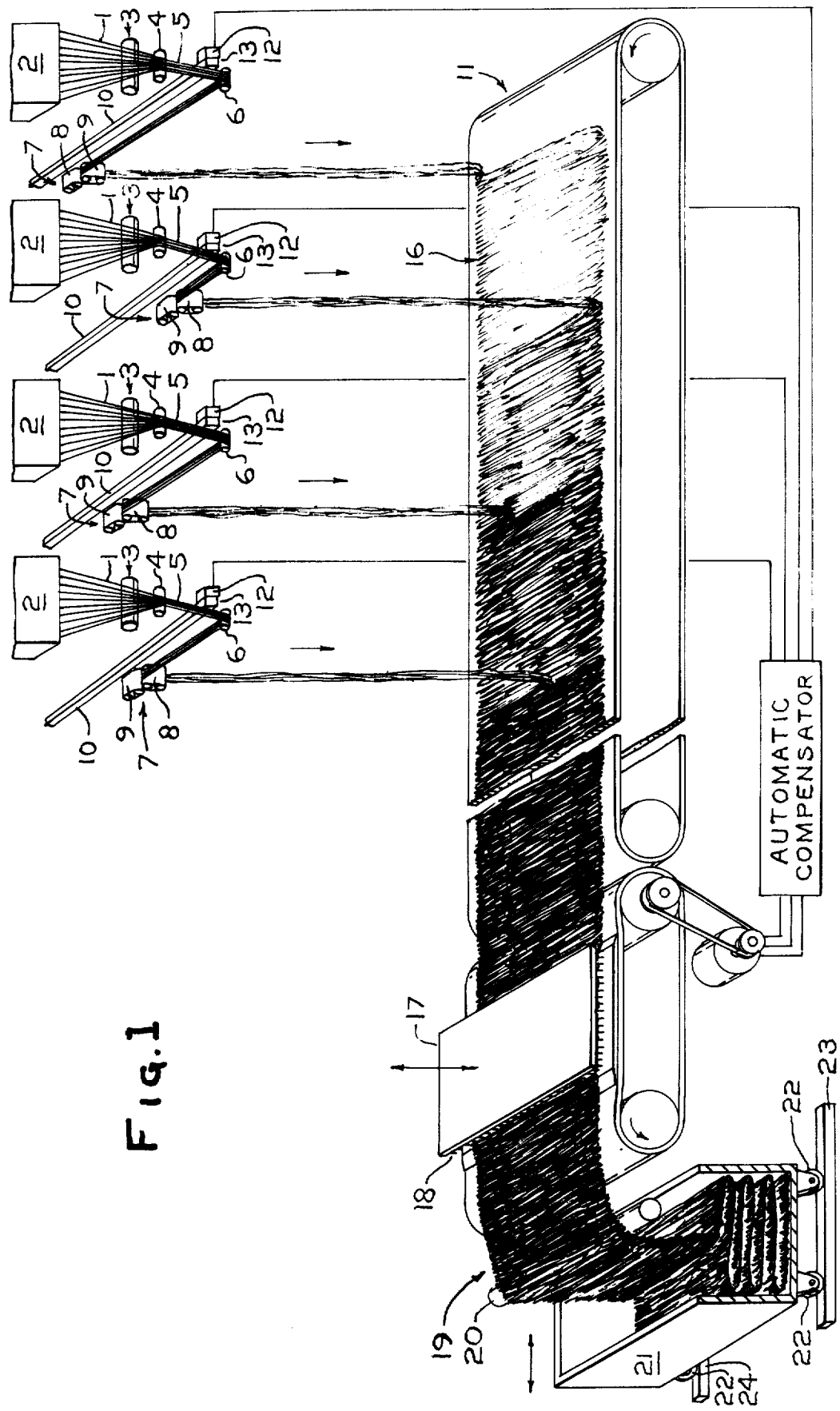
FIG. 1 is a schematic, perspective view of the process and apparatus for forming continuous uniform density mat.

Referring now to FIG. 1, glass fibers forming single filaments 1 are drawn from a bushing 2, passed over a roller applicator 3, which applies a suitable size to the filaments 1. The size lubricates the filaments to prevent them from breakage during further processing and additionally, provides a binder which holds the filaments 1 into a strand 5 which is to be subsequently formed. Further, the sizing composition provides adhesion between the glass filaments 1 and a resin matrix when the fibers are to be used for resin reinforcement. The sizing composition is usually an aqueous solution of a particular binder and a glass fiber lubricant.

After the filaments 1 are sized, they are passed over a gathering shoe 4. This gathering shoe is a cylinder having a plurality of grooves through which the filaments 1 are drawn together, thus forming strands 5. The gathering shoe 4 is formed from a material which has sufficient lubricative properties so that the filaments 1 may be gathered without breakage. A typical material of construction for the gathering shoe 4 is graphite, however, other materials may be used provided they supply the proper lubricity to prevent breakage of the strands 5 and filaments 1. The strands 5 are passed over an idler 6, which directs the strands 5 toward the attenuator 7. The strands are drawn between the belts 8 and 9, which are two opposing, flexible surfaces, which are traveling at the desired speed of attenuation by a motor not shown. The attenuator 7 is mounted on a track 10, which can be made of a channel properly constructed to allow the attenuator 7 to traverse in a horizontal plane to the long axis of the conveyor 11. The attenuator 7 thus traverses the width of the conveyor 11, depositing the strands 5 on the surface of the conveyor 11.

When the filaments 1 or the strands 5 break, what is normally termed "a breakout" occurs. Thus the attenuator will not be pulling strands 5 and attenuating fibers 1. In this situation, the attenuator must be drawn back to a home position 12 and rethreaded. As the attenuator is brought into the home position 12, it activates a switch mechanism 13, which signals an automatic compensator 14. The automatic compensator 14 slows the speed of the second conveyor 15 when the first conveyor 11 is delivering a mat 16 which is strand deficient when reaching conveyor 15. Thusly, when the second conveyor 15 is reduced in speed, the first conveyor 11 delivering the mat 16 at a constant speed but a lower density causes the strand deficient mat 16 to accumulate on conveyor 15, i.e., a mat of density comparable to that which was being produced when all bushings 2 and attenuator 7 were operating thereby forming a uniform density mat. Each of the bushings 2 are equipped with switches to activate the automatic compensator 14.

After the mat 16 is transferred to the second conveyor 15, a needler 17, which is also connected to the automatic compensator 14, reciprocates vertically over and through the mat 16. A plurality of needles 18 are pushed through the mat and then pulled out to intertwine the strands and provide strength to the mat 16, thus producing a needled mat 19. The needled mat 19 is passed over a supporting guide roll 20 and into a collector 21. The collector 21 reciprocates in a plane with the movement of the conveyor 15 to fold the needled mat 19 in the collector 21 on wheels 22 mounted on tracks 23 and 24. The automatic compensator 14 also adjusts the speed of reciprocation of the collector 21 by means not shown to coincide with the speed of the second conveyor 15.

Because each of the bushings 2 have associated therewith means to signal automatic compensator 14, a uniform needled mat 19, can be produced notwithstanding the fact that strands 5 are not being delivered to the conveyor 11 by some of the bushings and attenuators.

Figure 2:
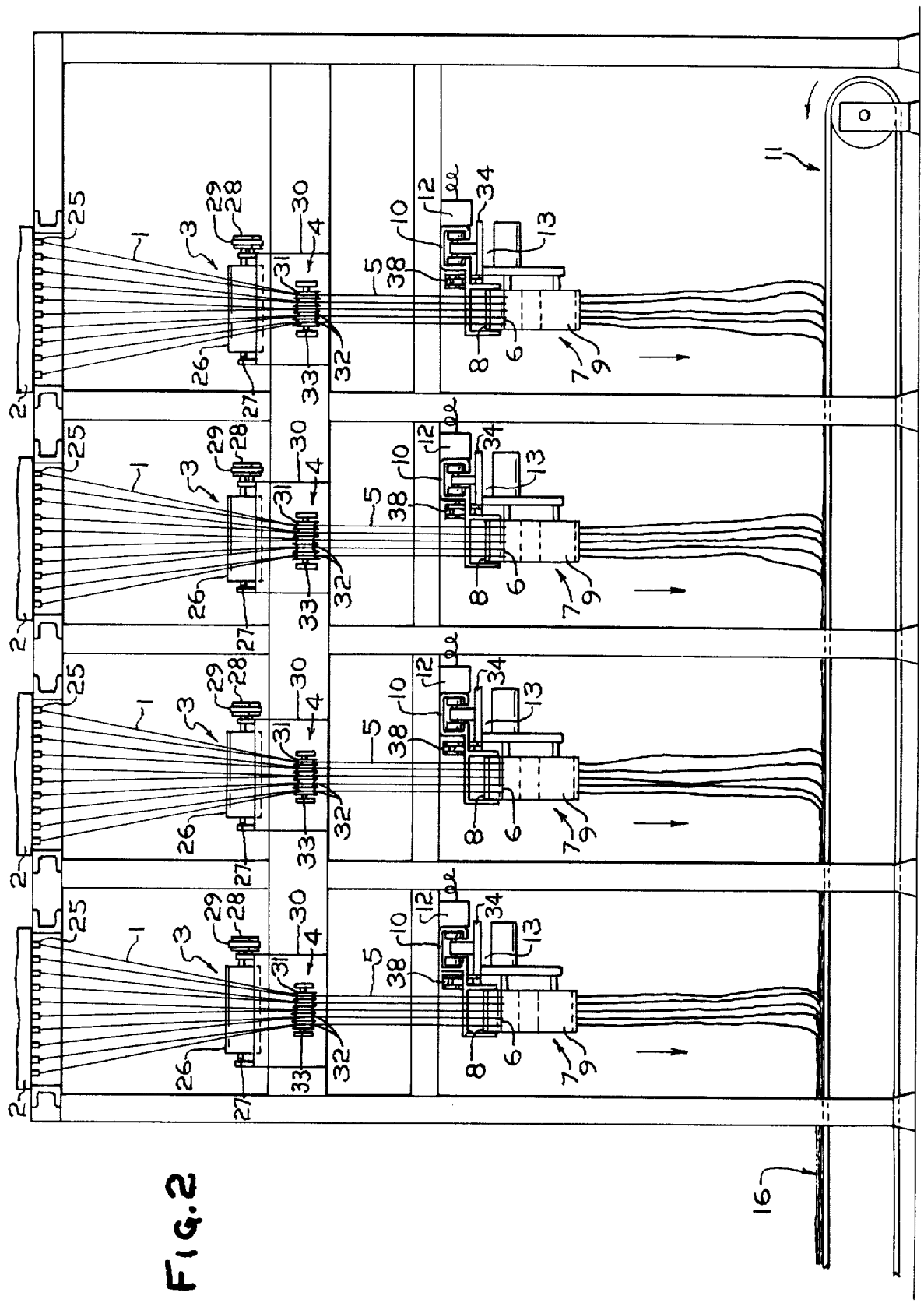
FIG. 2 is a schematic, longitudinal, elevational view of the fibers being formed, drawn into strands and deposited on the first conveyor.

Referring now to FIG. 2, the filaments 1 are being drawn from the bushing 2 through orifices 25 over a roller applicator 3. The roller applicator 3 is composed of a cylinder 26, which contacts the filaments 1. The cylinder 26 is mounted on a shaft 27, which is permanently fixed to a pulley 28 driven by a belt 29, which is driven by a motor not shown. The roller 26 is immersed in the pan 30, having the sizing composition in contact with the roller 26, thus applying the size of the aqueous sizing composition from the roller 26 to the filaments 1. The filaments 1 are then gathered into strands 5 by the gathering shoe 4. The gathering shoe 4 has a plurality of grooves 31, which draw the filaments 1 together to form the strands 5. The cylinder portion of the gathering shoe 32 is stationary about the shaft 32. The strands 5 are then passed over an idler 6, which directs the strands to the attenuator 7. The attenuator 7 is mounted on a support 34, which is mounted on a track 10. The attenuator 7 is then traversed in a direction parallel and horizontal to the conveyor 11. When a breakout occurs, the attenuator 7 is brought to the home position 12, activating a switching mechanism 13, which activates the automatic compensator 14 not shown in FIG. 2.

During operation, the attenuator 7 deposits the strands 5 on the conveyor 11 to form the mat 16; thus, it has been shown how the fibers are formed, gathered into strands, and deposited onto conveyor to form a continuous glass fiber mat.

Figure 3:
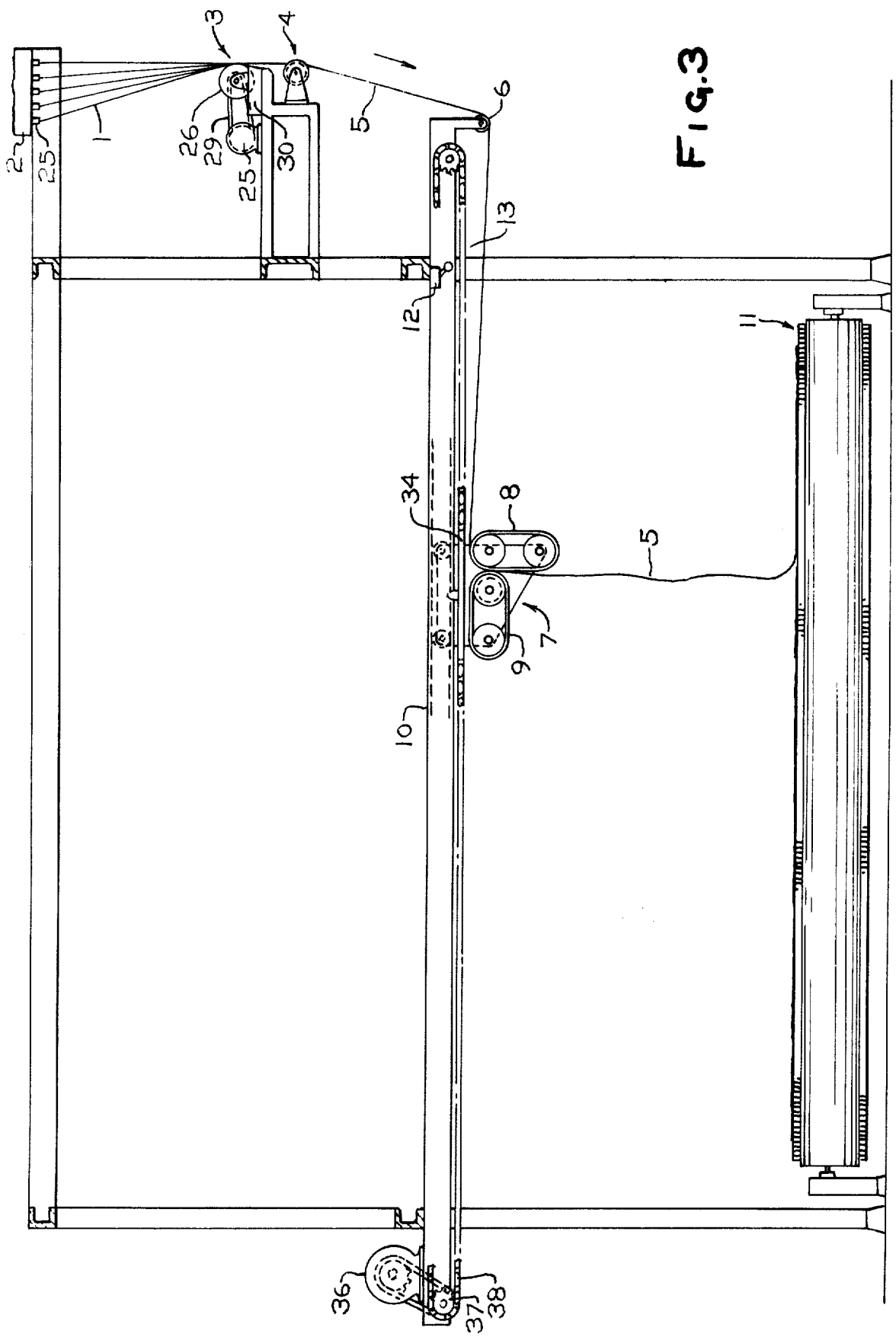
FIG. 3 is a schematic, longitudinal, elevational view of a single bushing and the apparatus associated therewith, showing the fibers being attenuated, gathered into strands, and deposited on the first conveyor.

Referring to FIG. 3, the filaments 1 are drawn from the bushing 2, having a plurality of orifices 25, passed over on the roller applicator 3, which is driven by the motor 35. The motor 35 rotates the cylinder 26 of the roller applicator, so that it immerses and turns in the pan 30. After sizing, the filaments 1 are gathered by the gathering shoe 4, and drawn into a plurality of strands 5. The strands are passed over an idler 6 and between the belts 29 of the attenuator 7. The attenuator 7 is driven by a motor not shown. The filaments 1 are drawn between the belts of the attenuator and perpendicularly layed onto the conveyor 11. The attenuator 7 is traversed by means of a reversing motor 36, which drives pulley 37, driving a chain 38 which traverses the support for the attenuator 34 across the width of the conveyor any desired distance.

When a breakout occurs, the attenuator 7 is brought to the home position 12 and activates a switch 13, which activates the automatic compensator 14 not shown in FIG. 3.

Figure 4:
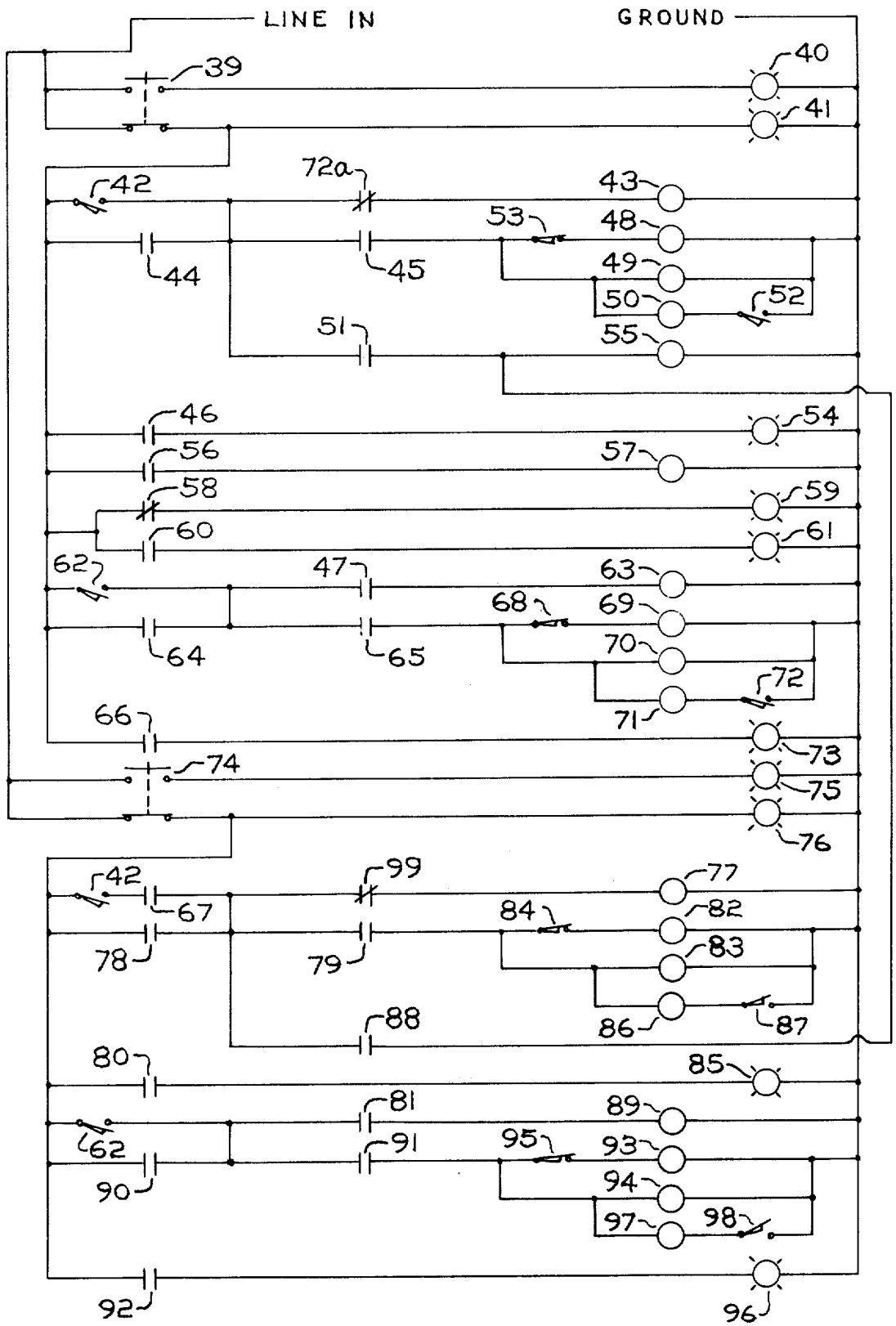
FIG. 4 is an elementary circuit diagram of the automatic compensator system.

Referring now to FIG. 4, there is shown an elementary wiring diagram of the automatic compensation control between an attenuator and the conveyor. Each attenuator has a substantially identical control system. The only difference between the control systems for the various attenuators is in the time cycle of the timing system, which is adjusted in accordance with the distance of the attenuator from the second conveyor.

As shown in FIG. 4, strip button 39 is provided to bypass the automatic compensation system when an attenuator breaks out and the repair is made within the time error factor of the timers in the compensation system. The strip light 40 signals an operator that the automatic compensation system is being bypassed. The strip button 39 is normally in the open position as shown, and when closed instantaneously cancels the timing in the automatic compensation system and is then returned to the open position. When the strip button 39 is open, which is the normal case, a light 41 signals the operator that the automatic compensation system is in operation. When a breakout is encountered and the attenuator is returned to the home position, limit switch 42 is activated, which charges a relay 43, closing contacts 44, 45, 46 and 47. Contact 46 activates a light which shows the first time cycle to be operational. Contacts 44 and 45 activate the timer motor 48 and the timer clutch 49. Contact 47 allows the second timing sequence to become operational at the time the attenuator is sent out. The timer motor 48 runs and at a predetermined time the timer clutch activates the timer relay 50, which closes contacts 51, the microswitch 52 is closed and the microswitch 52 is open, activating relay 55, closing contact 56, activating relay 57, which adjusts the potentiometer in FIG. 5, thus reducing the current to an electric clutch engaging the motor drive of the second conveyor. Also, contact 58 is opened, deactivating the speedup light 59 and contact 60 is closed activating the speed down light 61. After the attenuator has been rethreaded, it is sent out to traverse across the first conveyor. When this attenuator is sent out, it activates a limit switch 62, thus activating relay 63, closing contacts 64, 65, 66 and 67. Contacts 64 and 65 activate through microswitch 68, the timer motor 69 and the timer clutch 70. Contact 66 activates a light 73 which shows the speedup timing cycle has begun. Contact 67 closes to allow the next time cycle to be operational. At a predetermined time the timer relay 71 is activated by the timer clutch 70, which closes microswitch 72, opening microswitch 68, which opens contact 72a, de-energizing relay 57. The contacts associated therewith adjust the potentiometer in FIG. 5 to effect the electro-clutch to speed up the conveyor to its original level when the attenuator was operational.

During the process of attenuating the fibers onto the first conveyor and before the first time cycle is completed, there may be a breakout with a repair, and the attenuator can be sent out again. There may be a second breakout which will start a second time cycle. If the repair to the second breakout is made within the time error factor of the timers in the compensation system, the strip buttom 74 can be pressed to bypass the second time cycle system. When the strip buttom 74 is pressed, the light 75 is activated, showing the second time cycle system is bypassed. In its normal position the strip buttom 74 activates the light 76, which shows the second time cycle system is ready to be operated. When a second breakout occurs, limit switch 42 is tripped, activating relay 77, closing contacts 78, 79, 80 and 81. Contacts 78 and 79 activate timer motor 82 and and timer clutch 83 by way of microswitch 84. Contact 80 activates light 85 to show the third time cycle is in operation. When relay 86 is activated at the specified time by the timer clutch 83, it closes a microswitch 87 and opens a microswitch 84, activating relay 86, which closes contact 88, energizing relay 57, which adjusts the potentiometer in FIG. 5 to effect a slow down in the second conveyor.

When the attenuator is rethreaded and sent out, limit switch 62 is tripped, activating relay 89, closing contacts 90, 91 and 92. Contacts 90 and 91 activate timer motor 93 and timer clutch 94 by way of microswitch 95. Contact 92 activates light 96, showing that the fourth time cycle is in operation. At a predetermined time, time clutch 94 activates relay 97, closing microswitch 98 and opening microswitch 95, thus opening contact 99, which deactivates relay 57, causing the potentiometer in FIG. 5 to effect a slow down in the second conveyor.

Each attenuator in the continuous mat line system has the time cycle determined by its distance from the second conveyor; thus the attenuator being farther from a the second conveyor will have a longer time cycle than one being closer to a bushing.

Thus, it can be seen that further time cycle sequences accounting for more than two breakouts during the time the mat runs from the attenuator to a second conveyor can be compensated for by adding similar interconnecting circuits as previously described. It has been found, however, the above circuit is sufficient for this particular embodiment of the instant invention.

Figure 5:
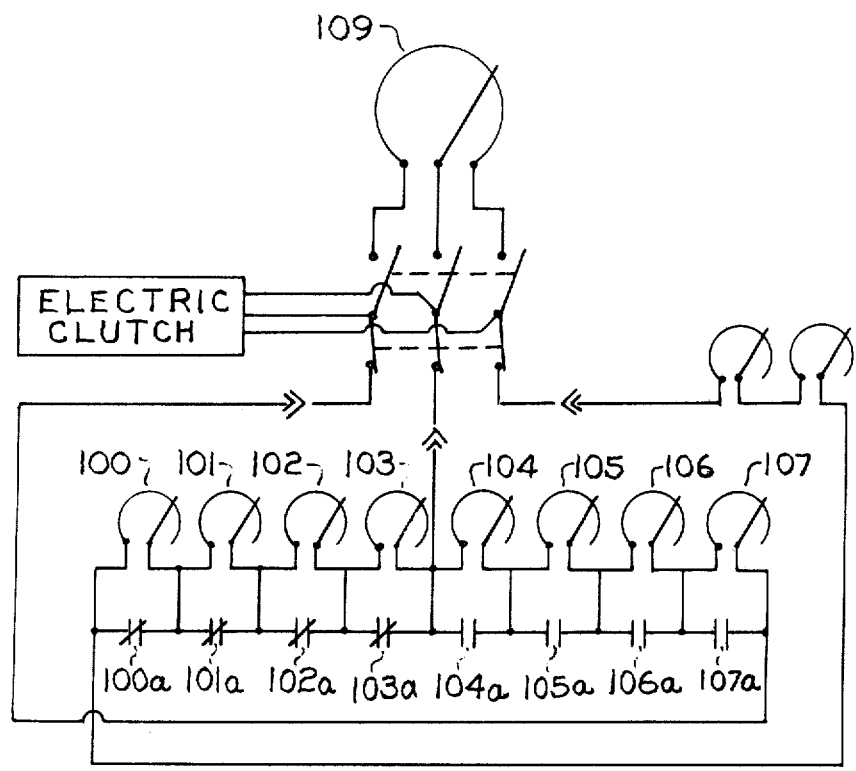
FIG. 5 is an elementary circuit diagram of the potentiometers controlling the speed of the second conveyor, which are connected to the compensation control system of FIG. 4.

Referring now to FIG. 5, there is shown the controlling potentiometer for the electric clutch engaging the motor drive of the second conveyor.

The bank of potentiometers 100, 101, 102 and 103 are shown connected in series and having contacts 100A, 101A, 102A and 103A. Each contact (100A-103A) is activated by a relay 57 on each of the attenuators respectively. In an analogous manner, contacts 104A, 105A, 106A and 107A are provided on potentiometers 104, 105, 106 and 107, respectively and are closed when a corresponding relay 57 is activated. Thus, it can be seen that potentiometers 100 through 103 are operational during the time when no bushings have broken out and the potentiometers 104, 105, 106 and 107 are in use when there is breakout corresponding to the attenuator to which the potentiometer is correlated. The current from the potentiometer is fed to an electric clutch 108, which engages the motor drive of the second conveyor.

The potentiometer 109 is used to manually adjust the speed of the second conveyor when the automatic compensation system is not in use.

The instant invention provides an efficient method and apparatus for forming a continuous glass fiber mat of uniform density. The invention has been described with reference to a specific embodiment thereof; however, it will be obvious to those skilled in the art that other circuitry and other methods of compensation may be used to effect the result of forming the uniform density mat. The scope of the instant invention is only to be limited insofar as is set forth in the accompanying claims.

I claim:

1. An apparatus for forming a continuous glass fiber mat comprising:

a plurality of glass fiber forming bushings;

a first conveyor positioned below said bushings and adapted to receive fibers attenuated from said bushings;

associated with each of said bushings:

an attenuator for pulling the fibers from each bushing during formation, means for traversing each said attenuator transverse to the path of travel of said conveyor in order to apply said glass fibers to said conveyor in a perpendicular fashion, a home position on said traversing means on which said attenuator is positioned when the bushing is not in operation, a first signaling means associated with said home position on said traversing means, timing means activated by said signaling means, a second signaling means associated with said timing means, a second conveyor placed adjacent to said first conveyor and adapted to receive fibers from said first conveyor, the speed of said second conveyor being adjusted by said second signaling means so that when one of said bushings is not in operation, said second conveyor speed is adjusted to compensate for said inoperable bushing at a time when the said first conveyor is deficient in glass fibers thereby forming a constant glass fiber mat density.

2. The apparatus of claim 1 including means for collecting the glass fiber mat formed, the speed of said collecting being adjusted by said second conveyor.

3. The apparatus of claim 1 having additionally a needler associated with said second conveyor to bind the glass fiber mat.

4. A method of forming a continuous uniform density glass fiber mat comprising:

forming glass fibers from a plurality of fiber forming bushings;

depositing said glass fibers from said bushings onto a first continuous conveyor;

conveying said glass fibers from said first continuous conveyor to a second continuous conveyor;

adjusting the speed of said second conveyor, when at least one of said bushings is not operating and a strand deficient glass fiber mat is formed, to slow the speed of said second conveyor to allow for a uniform bulk density of said glass fibers to be conveyed onto said second conveyor, said bulk density being the same as when all of said bushings are operating; and collecting the mat so formed.

5. The method of claim 4 including adjusting the speed of said second conveyor, after at least one of said bushings which was not operating begins to operate to increase the speed of said second conveyor, to allow for a uniform bulk density of said glass fibers to be conveyed onto said second conveyor, said bulk density being the same as when all of said bushings are operating.

6. The method of claim 4 having the additional step of adjusting the speed of collection of said glass fiber mat to correspond with the speed of said second conveyor.

7. In the method of producing a continuous glass fiber mat comprising:

forming glass fibers from a plurality of bushings by means of attenuation;

depositing said glass fibers perpendicularly and transversely onto a first continuous conveyor, conveying said glass fibers on said first continuous conveyor to a second continuous conveyor, thereby forming a glass fiber mat, and collecting the mat so formed;

the improvement comprising adjusting the speed of said second continuous conveyor, when at least one of said bushings is not operating and a strand deficient glass fiber mat is formed, to slow the speed of said second conveyor to allow for a uniform bulk density of said glass fibers to be conveyed onto said second conveyor, said bulk density being the same as when all of said bushings are operating.

8. The method of claim 7 having the additional step of adjusting the speed of collection of said glass fiber mat to correspond with the speed of said second conveyor.

9. The method of claim 7 including adjusting the speed of said second conveyor after at least one of said bushings which was not operating begins to operate to increase the speed of said second conveyor, to allow for a uniform bulk density of said glass fibers to be conveyed onto said second conveyor, said bulk density being the same as when all of said bushings are operating.

10. An apparatus for forming a continuous glass fiber mat comprising:

a plurality of glass fiber forming bushings, a first conveyor for receiving fibers which are attenuated from said bushings, a second conveyor for receiving glass fiber mat conveyed on said first conveyor, means for adjusting the speed of said second continuous conveyor when at least one of said bushings is not operating and a strand deficient glass fiber mat is formed, to slow the speed of said second conveyor to allow for a uniform density of said glass fibers to be conveyed onto said second conveyor, said bulk density being the same as when all of said bushings are operating; and means for collecting the mat so formed.

11. The apparatus of claim 10 including means for adjusting the speed of said second conveyor after at least one of said bushings which was not operating begins to operate to increase the speed of said second conveyor, to allow for a uniform bulk density of said glass fibers to be conveyed on said second conveyor, said bulk density being the same as when all of said bushings are operating.

12. The apparatus of claim 10 including means for adjusting the speed of collection of said glass fiber mat to correspond with the speed of said second conveyor.

13. The method of claim 4 having the additional step of needling the glass fiber mat during the second conveying operation.

14. The method of claim 7 having the additional step of needling the glass fiber mat during the second conveying operation.

* * * * *